(Model.)

3 Sheets—Sheet 1.

J. T. TROTT.
CAKE MACHINE.

No. 262,998.                    Patented Aug. 22, 1882.

WITNESSES
A. J. Oettinger
W. C. Fogg.

INVENTOR
J. T. Trott
by his attys
Clarke & Raymond (Model.)

J. T. TROTT.
CAKE MACHINE.

No. 262,998. Patented Aug. 22, 1882.

Witnesses
A. J. Oettinger
W. E. Fogg

Inventor
J. T. Trott
by his attys
Anker & Raymond (Model.)  J. T. TROTT.  3 Sheets—Sheet 3.

CAKE MACHINE.

No. 262,998.  Patented Aug. 22, 1882.

WITNESSES
A. J. Oettinger
W. C. Fogg

INVENTOR
J. T. Trott
by his attys
Clarke & Raymond

UNITED STATES PATENT OFFICE.

JOHN T. TROTT, OF WATERBURY, CONNECTICUT.

CAKE-MACHINE.

SPECIFICATION forming part of Letters Patent No. 262,998, dated August 22, 1882.

Application filed February 9, 1882. (Model.)

*To all whom it may concern:*

Be it known that I, JOHN T. TROTT, of Waterbury, in the county of New Haven and State of Connecticut, a citizen of the United States, have invented certain new and useful Improvements in Cake-Machines, of which the following is a full, clear, and exact description, reference being had to the accompanying drawings, forming a part of this specification, in explaining its nature, in which—

Figure 1:
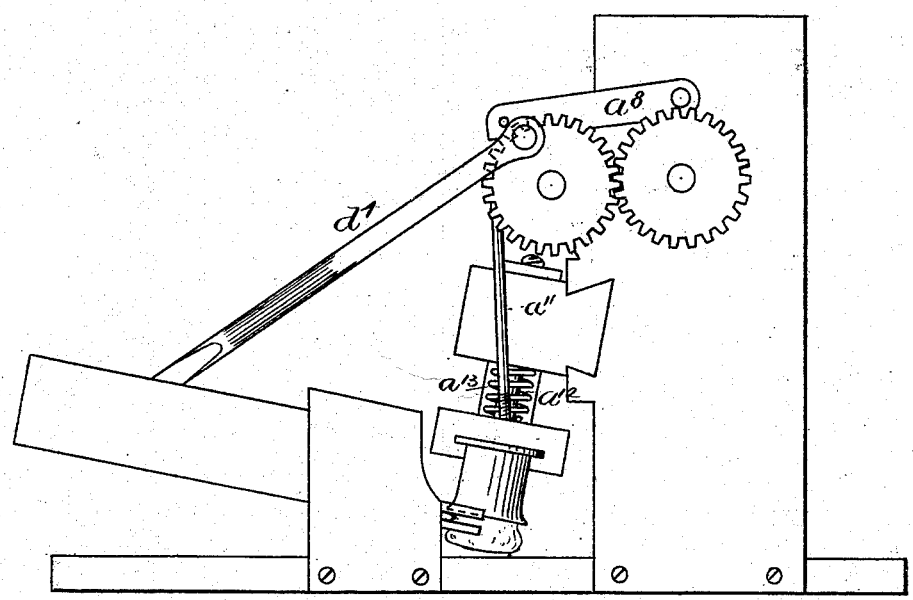
Figure 2:
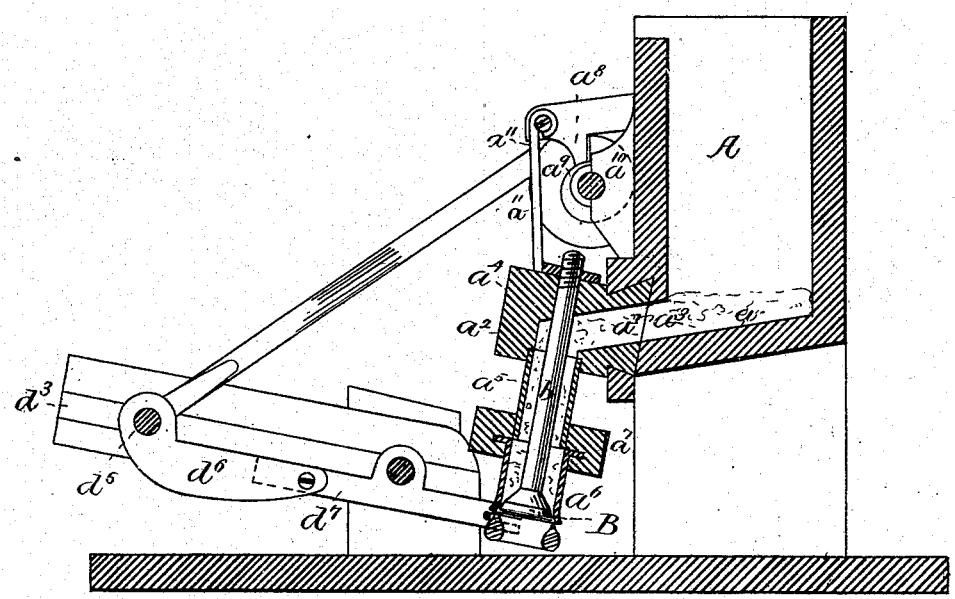
Figure 3:
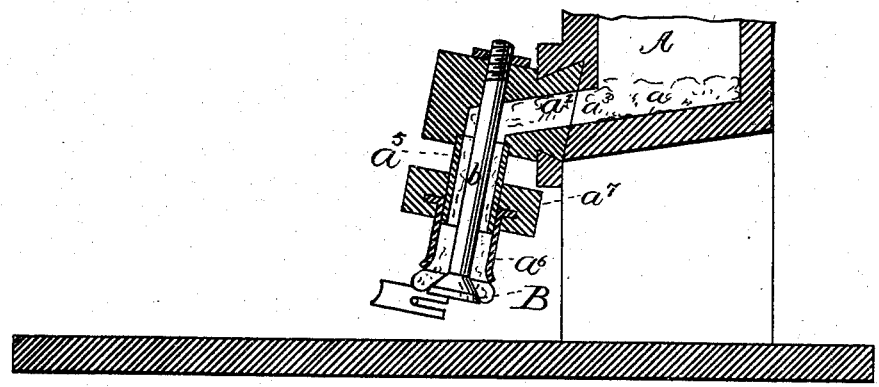
Figures 4, 5:
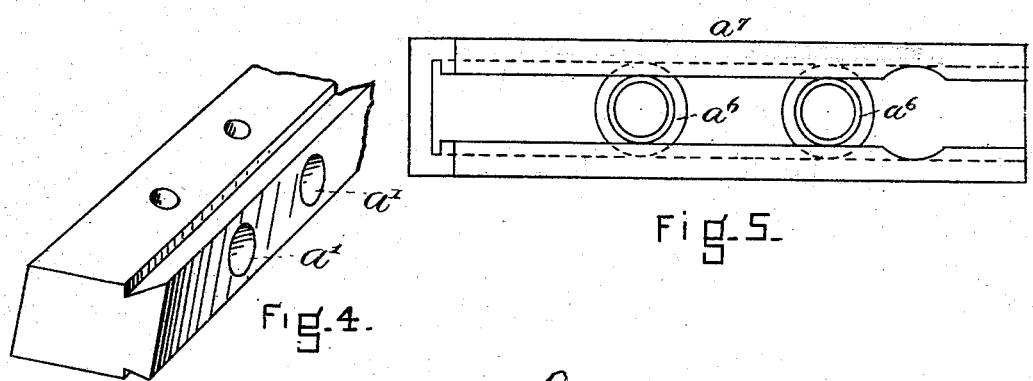
Figure 6:
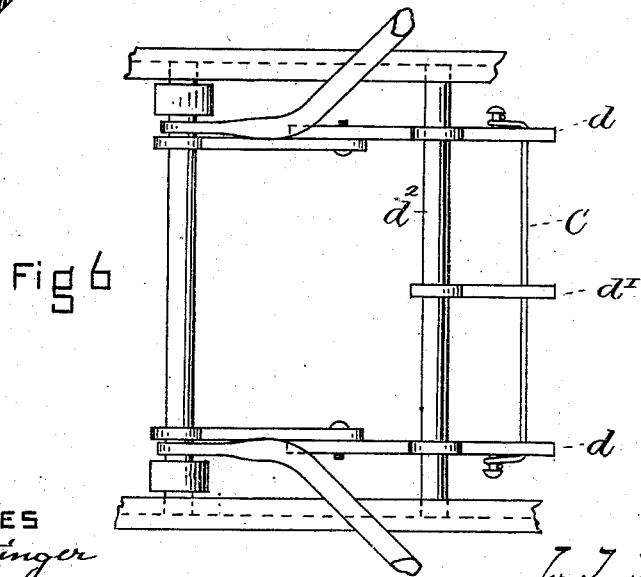
Figure 7:
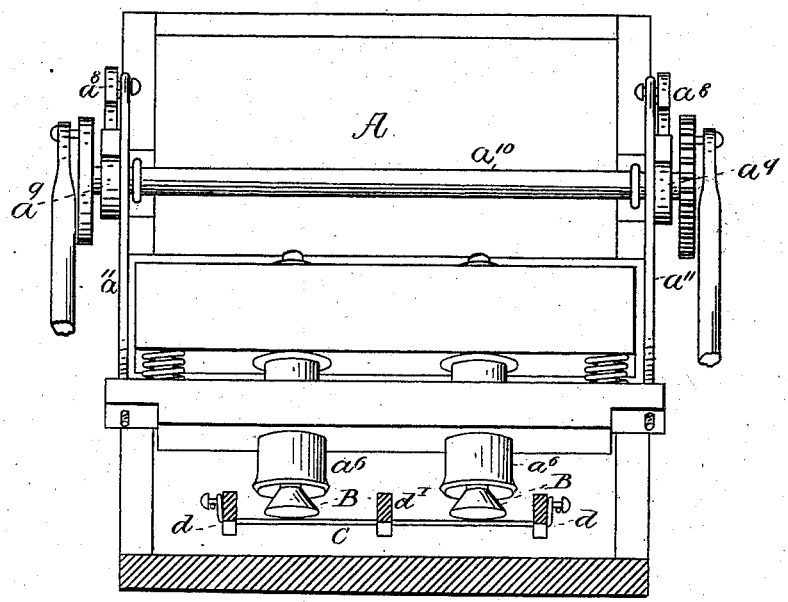

Figure 1 is a side elevation of a portion of a cake-machine, showing my improvement. Fig. 2 is a vertical central section thereof. Fig. 3 is a detail view in section, illustrating the operation of my invention. Figs. 4 and 5 are detail views, hereinafter referred to. Fig. 6 is a plan view of a portion of the mechanism shown in Fig. 1. Fig. 7 is a front elevation of a portion of the machine.

This invention embraces, first, the combination of inclined discharge-passages and their inclined openings, through which dough is adapted to be forced with a knife or cutter adapted to be reciprocated on an inclined plane parallel with the plane of the bottoms of the discharge-openings; second, the combination of the inclined discharge-passages and their inclined openings, and mechanism for alternately increasing or diminishing the size of each opening, whereby the openings are at one instant enlarged sufficiently to permit of the discharge of dough and the next instant closed sufficiently to check its flow, without, however, severing the dough which has passed through the opening from the mass of dough in the passage, with a knife or cutter adapted to be reciprocated on an inclined plane and parallel with the inclined plane of the bottom of the discharge-opening, whereby the dough which has been pressed through the opening is cut off while at rest.

It will be seen from the above statement of invention that my improvement relates to that class of cake-machines in which the dough, instead of being rolled into a sheet and cut into shape therefrom by hand-cutters, is forced automatically, under pressure, from a reservoir of dough, through discharge passages and openings, in cylindrical or other shapes, from the end of which the ring or disk of dough is severed automatically.

The dough-box A is preferably upright, rectangular in horizontal section, and its bottom forms the bed $a$, which is inclined toward the discharge-passages. Pressure is exerted upon the mass of dough in the box by means of any suitable mechanism, and I prefer a plate or diaphragm adapted to rest upon the dough in the box and to be forced downwardly slowly by screw-pressure. $a'$ are discharge-passages, and as many of them may be used as can be formed in the block $a^2$. They open from the long horizontal portion $a^3$ of the dough-box. This block is adapted to fit dovetail recesses at the lower end of the frame of the dough-box, as shown, and the discharge-passages $a'$ therein are curved or changed from a horizontal to very nearly a vertical direction. This block has projecting outwardly from its under surface as many tubes $a^5$ as there are discharge-passages, and they form continuations thereof. Each tube has a sleeve, $a^6$, which forms a continuation of the discharge-passage, and which is supported by a plate, $a^7$, which is reciprocated with the sleeves $a^6$ upon the tubes by means of two levers, $a^8$, and cams $a^9$, upon the shaft $a^{10}$ and connecting-rods $a^{11}$, the levers having projections which bear upon the cams. The rods $a^{12}$, projecting downwardly from the block $a^2$, furnish guides upon which the plate $a^7$ is reciprocated, and the springs $a^{13}$, surrounding the guide-rods, serve to return the plate to its original position, and also to keep the levers $a^8$ in contact with the cams.

At the lower end of each passage there is arranged a former, B, which is stationary, and which is supported by the rod $b$, which extends upwardly through the discharge-passage into and through the block $a^2$, to which it may be fastened in any desirable way. The upper surface of the former is inclined, and the lower edge of the sleeve which surrounds it is so shaped that the passage between the former and the sleeve is large enough to permit the dough to pass outwardly from the passage when the sleeve is lifted, substantially as shown in Fig. 3; but is not entirely closed when the sleeve closes or is shut downwardly thereon to the position shown in Fig. 2, although the flow of dough is checked. The discharge-openings are inclined in order that the ring or piece of dough, when severed, may fall upon the pan placed to receive it without losing its shape and in regular order. This result is accomplished because the knife or severing device is operated to cut on a plane parallel with the plane of the discharge-openings and from the highest to the lowest point, thereby severing the dough which is highest first and allowing it to reach substantially a horizontal position by the time that it is passed through the last portion of its cut, thereby suspending, as it were, the ring or cake of dough in a horizontal plane in the act of cutting, so that the ring or piece of dough falls with all portions on a horizontal plane, instead of with one portion in advance of the remainder.

The severing device consists in a wire, C, which is attached to and supported by the end arms, $d$, and one or more intermediate arms, $d'$. These arms are supported by the cross-bar $d^2$, the ends of which project into the guides $d^3$ in the frame of the machine, and the knife-bar and severing-wire are reciprocated by means of reciprocating crank-rods $d^4$ and bar $d^5$, having its ends resting in the guides $d^3$, and the arms $d^6$, which connect the bar $d^5$ with the arms $d^7$, extending backwardly from the cross-bar $d^2$.

I do not intend to confine myself to the arrangement of the discharge-openings to the dough-boxes herein described, nor to the use of an upright dough-box; but I may employ a horizontal dough-box, if desired, and discharge-passages, substantially as herein represented.

In case it is desired to make cakes other than rings or without holes, the former B is removed and the valve is employed in the upper portion of the passage, or at the junction of the passage with the dough-box, for regulating the passage of the dough.

In operation the dough is compressed in the box until the requisite pressure is obtained, and then the mechanism for operating the feeding and severing devices is started, and the several pieces of dough fall into the pans, which are fed under the discharge-openings upon a belt or in any desirable manner. It will be observed that by this arrangement the discharge-openings are at the front of the machine and in an exposed position, so that the pans can be placed more accurately for the reception of the dough than they could be if the openings were concealed from sight, as is the case with all cake-machines of this class heretofore used; also, that the arms or fingers supporting the wire cutter between the end supports not only serve to keep them in position, but also act as a clamping device for fastening it in position and holding it tight, so that practically the cutters may be divided by the fingers into sections corresponding to the number of the discharge-openings, so that in case the wire upon one section breaks it can be replaced without removing the remainder of the cutter.

It will be noticed that by inclining the bottom of the dough-box toward the discharge-passages almost the entire mass of dough may be pressed from the box into the discharge-openings, thereby leaving comparatively little in the dough-box to be wasted.

Having thus fully described my invention, I claim and desire to secure by Letters Patent of the United States—

1. In a cake-machine, a series of inclined discharge-openings through which dough is adapted to be forced, in combination with a reciprocating knife or cutter adapted to be reciprocated below said discharge-openings on an inclined plane parallel with that of said openings and somewhat inclined to a horizontal plane, substantially as and for the purposes described.

2. The combination, in a cake-machine, of inclined discharge-openings and mechanism, substantially as specified, whereby the openings are alternately increased and diminished in size to permit of the discharge of dough and check its flow without severing it, with a knife or a cutter adapted to be reciprocated on a plane parallel with the plane of the bottom of the discharge-openings, whereby dough is fed and checked and severed while checked, substantially as and for the purposes described.

JOHN T. TROTT.

Witnesses:
A. J. BLAKESLEY,
GEO. E. JUDD.